(12) United States Patent
Divliansky et al.

(10) Patent No.: US 9,778,404 B2
(45) Date of Patent: Oct. 3, 2017

(54) ACHROMATIC HOLOGRAPHIC PHASE MASKS, METHODS, AND APPLICATIONS

(71) Applicant: University of Central Florida Research Foundation, Inc., Orlando, FL (US)

(72) Inventors: Ivan Divliansky, Orlando, FL (US); Leonid Glebov, Orlando, FL (US); Evan Hale, Orlando, FL (US); Bahaa Saleh, Orlando, FL (US); Boris Zeldovich, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 15/040,367

(22) Filed: Feb. 10, 2016

(65) Prior Publication Data
US 2016/0231489 A1 Aug. 11, 2016

Related U.S. Application Data

(60) Provisional application No. 62/114,297, filed on Feb. 10, 2015.

(51) Int. Cl.
*G02B 5/32* (2006.01)
*G02B 27/10* (2006.01)
(Continued)

(52) U.S. Cl.
CPC ........... *G02B 5/32* (2013.01); *G02B 27/1006* (2013.01); *G03H 1/0248* (2013.01); *G02B 5/04* (2013.01);
(Continued)

(58) Field of Classification Search
CPC ............... G02B 27/22; G02B 27/2214; G02B 27/2221; G02B 27/2228; G02B 27/2242; G02B 27/226; G02B 27/02; G02B 27/2207; G02B 5/32; G02B 5/0252; G02B 27/0944; G02B 5/04; G02B 5/045; G02B 27/1006; G02B 27/126; H04N 13/0402;
(Continued)

(56) References Cited

U.S. PATENT DOCUMENTS 4,786,124 A * 11/1988 Stone ..................... G01D 5/38 359/15
6,673,497 B2 * 1/2004 Efimov ................... G03H 1/02 359/3
(Continued)

*Primary Examiner* — Jade R Chwasz
(74) *Attorney, Agent, or Firm* — Bond, Schoeneck & King, PLLC; William Greener

(57) ABSTRACT

A phase converting device capable of use over a broad wavelength range, which may be used for optical beam transformations and combining, conversion of resonator and waveguide modes, correction of aberrations in optical systems, and selection of photons with specific phase profile. This provides significant advantages in high power laser systems. Large-mode-area fibers can be used to provide higher incident powers than can be achieved by single-mode fibers, reducing the number of elements in a system necessary to achieve the desired output. The profiles of these LMA fiber modes can then be converted from the undesired modes into the desired mode while combing their total power into a single beam.

6 Claims, 1 Drawing Sheet

(51) Int. Cl.
*G03H 1/02* (2006.01)
*G02B 5/04* (2006.01)
*G02B 27/12* (2006.01)
*G03H 1/22* (2006.01)
*G03H 1/26* (2006.01)

(52) U.S. Cl.
CPC ... *G02B 27/126* (2013.01); *G03H 2001/2265* (2013.01); *G03H 2001/266* (2013.01)

(58) Field of Classification Search
CPC ........... H04N 13/0404; H04N 13/0406; H04N 13/0415; H04N 13/04; H04N 13/0409; H04N 13/0422; H04N 13/0431; G03H 2222/16; G03H 2222/17; G03H 2222/18; G03H 2222/20; G03H 2222/23; G03H 2222/24; G03H 2222/31; G03H 2222/32; G03H 2222/33; G03H 2222/34; G03H 2222/35; G03H 2222/36; G03H 2222/40; G03H 1/2286; G03H 1/0248; G03H 1/2249; G03H 2001/2234; G03H 2001/2289; G03H 2001/2265; G03H 2001/226
USPC ................................ 359/463, 462, 467, 475
See application file for complete search history.

(56) References Cited

U.S. PATENT DOCUMENTS

2011/0235145 A1\* 9/2011 Futterer ................. G02B 5/045
359/226.3
2012/0327490 A1\* 12/2012 Barbastathis ........ G03H 1/0005
359/9

\* cited by examiner

ACHROMATIC HOLOGRAPHIC PHASE MASKS, METHODS, AND APPLICATIONS

REFERENCE TO RELATED APPLICATION

The instant application claims priority to U.S. provisional application Ser. No. 62/114,297 filed 10 Feb. 2015, the subject matter of which is incorporated by reference herein in its entirety.

GOVERNMENT RIGHTS IN INVENTION

The research was supported by the following contracts: HEL JTO 6501-6214 "Bragg gratings, research, testing and high power applications" HEL JTO; 6501-8375 "Recording of phase mask in PTR glass", and HEL JTO 6501-8413 "Design for the LP01-LP02 mode transformer based on phase mask." The U.S. government has certain rights in the invention.

BACKGROUND

Conventional phase masks have been developed over the past several decades to produce a controlled phase profile for an optical system. They have been recorded using a wide variety of substrates such as photoresist and dichromated gelatin but in each case the principle behind the element is the same. In order to create the local phase profile the local optical path length is controlled, whether by controlling the geometrical path length or the local refractive index. In either case, because the optical path length is controlled, the phase profile is designed for a specific wavelength corresponding to that optical path length difference. This inherently limits conventional phase masks to uses in monochromatic systems as in broadband systems it is impossible to provide the same optical path length difference for every wavelength.

The use of holographic phase masks has been demonstrated in the literature for thin films where the probe wavelength is the same as the recording wavelength. See, Y. Ishii and T. Kubota, "Wavelength demultiplexer in multimode fiber that uses optimized holographic optical elements," Applied Optics 32, 4415-4422 (1993); Aoki et al., "Selective multimode excitation using volume holographic mode multiplexer," Optics Letters 38, 769-771 (2013); D. Flamm et al., "All-digital holographic tool for mode excitation and analysis in optical fibers," Journal of Lightwave Technology 31, 1023-1032 (2013); and Akayam et al., "Mode demultiplexer using angularly multiplexed volume holograms," Optics Express 21, 012920 (2013), all of which are hereby incorporated in their entireties by reference.

The recording medium for VBGs is photo-thermo-refractive (PTR) glass, which is a photosensitive glass with a high damage threshold, low absorption, and wide transparency region, making it a suitable substrate for high power systems [See, L. B. Glebov, "Photochromic and photo-thermo-refractive (PTR) glasses," Encyclopedia of Smart Materials, John Wiley & Sons, NY, 770-780 (2002); Oleg M. Efimov, Leonid B. Glebov, Larissa N. Glebova, Vadim I. Smirnov. Process for production of high efficiency volume diffractive elements in photo-thermo-refractive glass. U.S. Pat. No. 6,586,141 B1. Jul. 1, 2003; and Oleg M. Efimov, Leonid B. Glebov, Vadim I. Smirnov. High efficiency volume diffractive elements in photo-thermo-refractive glass. U.S. Pat. No. 6,673,497 B2. Jan. 6, 2004, all of which are hereby incorporated in their entireties by reference.

This glass is photosensitive in near UV spectral region and it is transparent from 350 to 2700 nm. This medium was successfully used for volume phase masks [See, Marc SeGall, Vasile Rotar, Julien Lumeau, Sergiy Mokhov, Boris Zeldovich, and Leonid B. Glebov. Binary volume phase masks in photo-thermo-refractive glass. Opt. Lett. 37 (2012) 190-192, the entirety of which is hereby incorporated by reference.] was found for this glass and was used for recording of both diffracting and refractive optical elements [See, L. B. Glebov and V. I. Smirnov. Interaction of photo-thermo-refractive glass with nanosecond pulses at 532 nm. Laser-Induced Damage in Optical Materials. Ed. G. J. Exarhos, A. H. Guenther, N. Kaiser, K. L. Lewis, M. J. Soileau, C. J. Stolz. Proceedings of SPIE 5273 (2004) 396-401; Leo Siiman, Julien Lumeau, Larissa Glebova, Vadim Smirnov, Leonid B. Glebov. Production of high efficiency diffractive and refractive optical elements in multicomponent glass by nonlinear photo-ionization followed by thermal development. U.S. Pat. No. 8,399,155; Mar. 19, 2013, all of which are hereby incorporated in their entireties by reference.]

Past phase masks achromatization concepts have involved several different techniques involving additional phase masks, birefringence, and thin films [See, R. Galicher, P. Baudoz, and J. Baudrand. Multi-stage four-quadrant phase mask: achromatic coronagraph for space-based and ground-based telescopes. A&A 530, A43. ESO. Mar. 28, 2011; D. Mawet, P. Riaud, J. Baudrand, P. Baudoz, A. Boccaletti, O. Dupuis, and D. Rouan. The four-quadrant phase mask coronagraph: white light laboratory results with an achromatic device. A&A 448, 801-808. ESO. Nov. 8, 2006; P. Riaud, A. Boccaletti, D. Rouan, F. Lemarquis, and A. Labeyrie. The four-quadrant phase-mask coronagraph. ii. simulations. Astronomical Society of the Pacific, Vol. 113, No. 787. pp. 1145-1154. September 2001, each of which is hereby incorporated in their entirety by reference]. Multiple phase masks have been used together in attempt to minimize the presence of other wavelengths. Individual phase masks are designed for a specific wavelength and then placed subsequent to one another. A second concept is the use of birefringence in materials as half wave plates, and create the same effect as a phase mask with the resulting polarization changes. Layers of thin films have also been proposed based on phase differences resulting from reflections.

Volume Bragg gratings (VBGs) are diffractive optical elements fabricated in a transparent optical material which possess periodical variation of refractive index in one direction. A VBG provides diffraction of an incident optical beam if it has a proper wavelength and launched at a proper angle of incidence (Bragg condition). An ideal VBG has a uniform average refractive index and a uniform spatial refractive index modulation. These features enable fine spectral and angular selection when diffracted beams have no induced phase distortions. Such VBGs are recorded in photosensitive media by exposing them to an interference pattern produced by coherent collimated beams with uniform spatial distribution of intensity and phase. One important peculiarity of VBGs is the ability to multiplex multiple elements in the same volume of a photosensitive medium. It enables creation several optically independent elements in the same volume.

Phase masks are optical elements which provide different optical path lengths across an aperture. A spatial phase profile (spatial profile of optical path which is a product of refractive index and geometrical thickness) is produced by shaping of surface of corresponding optical elements (conventional surface phase masks) or by spatial variations of refractive index (volume phase masks). The general feature of all phase masks is their ability to transform modes of light propagation. It is clear that phase masks work at only specified wavelength because the phase shift is uniquely determined by a product of refractive index and thickness.

A new recently invented type of phase masks (Leonid Glebov, Ivan Divliansky, Marc SeGall. Holographic phase masks recorded in volume Bragg gratings. U.S. Non-Provisional patent application filed on Oct. 23, 2014 as Ser. No. 14/521,852, the entirety of which is hereby incorporated by reference) is fabricated by the interference of coherent beams with specific phase profiles. Such phase masks, also called holographic phase plates (HPLs). These complex optical elements provide diffraction of an incident beam (as conventional VBG) if the angle of incidence corresponds to the Bragg angle for a given wavelength. However, different parts of the diffracted beam have specific mutual phase relations determined by phase relations in the recording beam. The HPL will operate only when it is illuminated with a specific wavelength at the volume grating's Bragg angle. This means that HPL can be used at different wavelengths if it is angularly tuned in order to meet the corresponding Bragg condition. It is well known that holograms in general possess high chromatism and can be reconstructed only at the same wavelength that was used for recording. However, it is an inherent property of uniform VBGs that by proper choice of incident angle, diffraction can be obtained for different wavelengths. This effect is provided by changing incident angles to satisfy Bragg condition for different wavelengths. This VBG inclination automatically provides changing of phase incursion for a propagating beam and, therefore, keeps the phase profile in the diffracted beam constant for any wavelength (if phase shift is measured in wavelengths). This is why, contrary to conventional phase masks, holographic phase masks imbedded in VBGs are tunable and can operate at any wavelength that can satisfy Bragg condition for a recorded VBG.

It is an object and advantage of the present invention to provide near-diffraction-limited high-power beams with wide spectra by taking advantage of the high power capacity of large-mode-area fibers which generate undesirable higher order modes and then converting them to the fundamental mode and combining them into a single high-power beam.

It is another object and advantage of the present invention to employ as a multiplexer/demultiplexer.

It is a further object and advantage of the present invention to provide a system that is easily manufactured without the need of expensive precision thickness measurements or birefringent crystal structures.

Other objects and advantages of the present invention will in part be obvious and in part appear hereinafter.

SUMMARY OF THE INVENTION

Conventional phase masks have been developed over the past several decades to produce a controlled phase profile for an optical system. They have been recorded using a wide variety of substrates such as photoresist and dichromated gelatin but in each case the principle behind the element is the same. In order to create the local phase profile the local optical path length is controlled, whether by controlling the geometrical path length or the local refractive index. In either case, because the optical path length is controlled, the phase profile is designed for a specific wavelength corresponding to that optical path length difference. This inherently limits conventional phase masks to uses in monochromatic systems as in broadband systems it is impossible to provide the same optical path length difference for every wavelength.

The use of holographic phase masks has been demonstrated in the literature for thin films where the probe wavelength is the same as the recording wavelength. However, we record our hologram in a thick element, so any wavelength satisfying the Bragg condition, regardless of whether or not it is the recording wavelength, will diffract and have the same phase profile. Based on the transparency window of PTR glass, this provides a useful wavelength range from 325 nm to beyond 2 μm, vastly surpassing the monochromatic nature of traditional phase masks and spatial light modulators.

The recording medium for VBGs is photo-thermo-refractive (PTR) glass, which is a photosensitive glass with a high damage threshold, low absorption, and wide transparency region, making it a suitable substrate for high power systems. This glass is photosensitive in near UV spectral region and it is transparent from 350 to 2700 nm. This medium was successfully used for volume phase masks. Moreover, a nonlinear sensitivity to high power laser radiation was found for this glass and was used for recording of both diffracting and refractive optical elements.

Past phase masks achromatization concepts have involved several different techniques involving additional phase masks, birefringence, and thin films. Multiple phase masks have been used together in attempt to minimize the presence of other wavelengths. Individual phase masks are designed for a specific wavelength and then placed subsequent to one another. A second concept is the use of birefringence in materials as half wave plates, and create the same effect as a phase mask with the resulting polarization changes [16]. Layers of thin films have also been proposed based on phase differences resulting from reflections. The present invention is unique by dispersing the wavelengths separately and applying the phase differences to each individual wavelength. As well, our system is easily manufactured without the need of expensive precision thickness measurements or birefringent crystal structures.

This invention creates an achromatic volume hologram of a phase element as shown in FIG. 1, where a holographic phase mask is placed in between two optically dispersive elements that have the same angular dispersion as the volume Bragg grating. This removes the need of angular tuning of the volume grating when the wavelength is changed. The Bragg condition is automatically met for new wavelengths due to the wavelength dispersion that the first element introduces.

An aspect of the invention is an achromatic holographic phase element. According to an embodiment, the achromatic holographic phase element includes an entrance and an exit optically dispersive element fixedly disposed in optically spaced relation to one another, wherein each of the entrance and the exit optically dispersive elements is characterized by an angular dispersion; and a volume Bragg grating (VBG) characterized by an angular dispersion, including at least one achromatic holographic phase mask recorded therein, the VBG being fixedly disposed intermediate the entrance and the exit optically dispersive elements, wherein the angular dispersion of the entrance and the exit optically dispersive elements matches the angular dispersion of the VBG. Alternative embodiments may include one or more of the following features, limitations, elements, or characteristics alone or in various combinations:

wherein the entrance and the exit optically dispersive elements are identical optically identical surface diffraction gratings;

wherein the entrance and the exit optically dispersive elements are optically identical prisms;

characterized by an achromaticity from 765 nm to 1071 nm.

An aspect of the invention is a method for combining a plurality of optical beams each having a different spectral bandwidth into a single optical beam. In an embodiment, the method includes providing an achromatic holographic phase element comprising an entrance and an exit optically dispersive element fixedly disposed in optically spaced relation to one another, wherein each of the entrance and the exit optically dispersive elements is characterized by an angular dispersion, and a volume Bragg grating (VBG) characterized by an angular dispersion, including at least one achromatic holographic phase mask recorded therein, the VBG being fixedly disposed intermediate the entrance and the exit optically dispersive elements, wherein the angular dispersion of the entrance and the exit optically dispersive elements matches the angular dispersion of the VBG; and inputting a plurality of collimated optical beams each having a different spectral bandwidth to the entrance optically dispersive element. In various embodiments, the method may include one or more of the following steps, features, limitations, elements, or characteristics alone or in various combinations:

wherein the plurality of input beams are in a spectral bandwidth from 765 nm to 1071 nm.

As used herein, the term 'fixedly' means that the element(s) to which it refers is not, nor does not need to be, rotated, angularly adjusted, transposed, shifted, or otherwise moved; rather, the element(s) remains stationary in a fixed position and orientation.

BRIEF DESCRIPTION OF THE DRAWINGS

The present invention will be more fully understood and appreciated by reading the following Detailed Description in conjunction with the accompanying drawings, in which.

DETAILED DESCRIPTION OF NON-LIMITING, EXEMPLARY EMBODIMENTS

Figure 2:
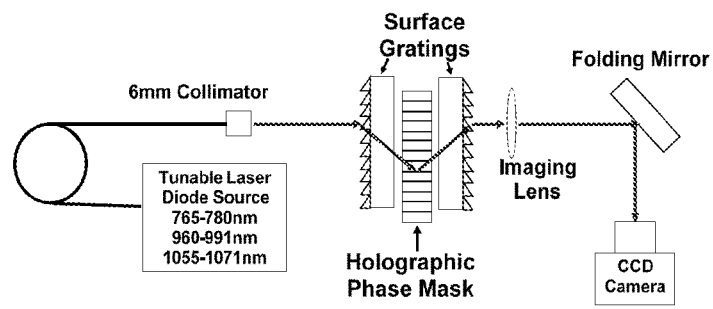
FIG. 2 is an experimental set up for demonstrating how a holographic phase mask could be made achromatic.

Volume Bragg gratings (VBGs) are diffractive optical elements fabricated in a transparent optical material which possess periodical variation of refractive index in one direction. A VBG provides diffraction of an incident optical beam if it has a proper wavelength and launched at a proper angle of incidence (Bragg condition). An ideal VBG has a uniform average refractive index and a uniform spatial refractive index modulation. These features enable fine spectral and angular selection when diffracted beams have no induced phase distortions. Such VBGs are recorded in photosensitive media by exposing them to an interference pattern produced by coherent collimated beams with uniform spatial distribution of intensity and phase. One important peculiarity of VBGs is the ability to multiplex multiple elements in the same volume of a photosensitive medium. It enables the creation of several optically independent elements in the same volume.

Phase masks are optical elements that provide different optical path lengths across an aperture. A spatial phase profile (spatial profile of the optical path, which is a product of refractive index and geometrical thickness) is produced by shaping of the surfaces of corresponding optical elements (conventional surface phase masks) or by spatial variations of refractive index (volume phase masks). The general feature of all phase masks is their ability to transform modes of light propagation. It is clear that phase masks work at only specified wavelength because the phase shift is uniquely determined by a product of refractive index and thickness.

A new, recently invented type of phase mask (Leonid Glebov, Ivan Divliansky, Marc SeGall, Holographic phase masks recorded in volume Bragg gratings, U.S. Non-Provisional patent application filed on Oct. 23, 2014 as Ser. No. 14/521,852) is fabricated by the interference of coherent beams with specific phase profiles. Such phase masks are also called holographic phase plates (HPLs). These complex optical elements provide diffraction of an incident beam (as does a conventional VBG) if the angle of incidence corresponds to the Bragg angle for a given wavelength. However, different parts of the diffracted beam have specific mutual phase relations determined by phase relations in the recording beam. The HPL will operate only when it is illuminated with a specific wavelength at the volume grating's Bragg angle. This means that the HPL can be used at different wavelengths if it is angularly tuned in order to meet the corresponding Bragg condition. It is well known that holograms in general possess high chromatism and can be reconstructed only at the same wavelength that was used for recording. However, it is an inherent property of uniform VBGs that by proper choice of incident angle, diffraction can be obtained for different wavelengths. This effect is provided by changing incident angles to satisfy the Bragg condition for different wavelengths. This VBG inclination automatically provides changing of phase incursion for a propagating beam and, therefore, keeps the phase profile in the diffracted beam constant for any wavelength (if phase shift is measured in wavelengths). This is why, contrary to conventional phase masks, holographic phase masks imbedded in VBGs are tunable and can operate at any wavelength that can satisfy the Bragg condition for a recorded VBG.

Figure 1:
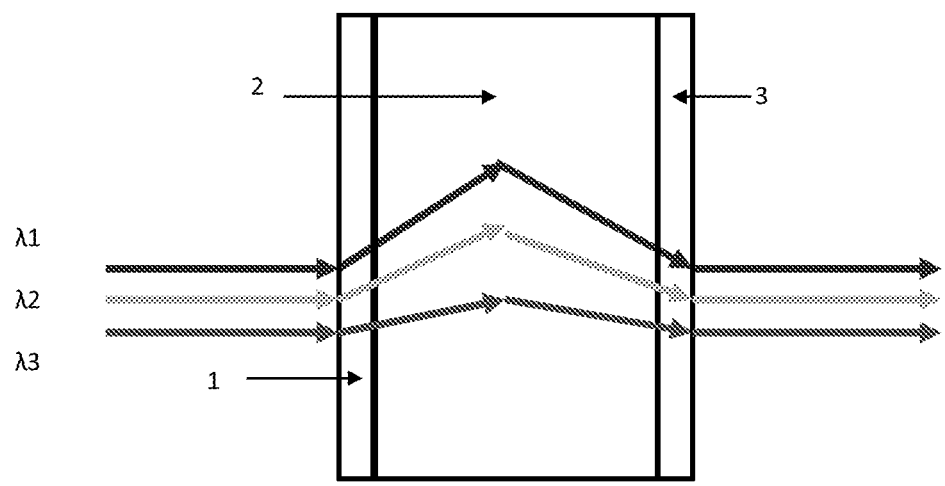
FIG. 1 is a drawing of an achromatic volume hologram of a phase element.

In an aspect the instant invention provides a method of creation of achromatic phase masks by using a combination of a single, tunable HPM (2) with a pair of dispersing optical elements (1, 3) such as prisms or surface diffraction gratings positioned on both sides of the single HPM. The role of the entrance dispersing element (1) is to diffract incident radiation in such manner that an angle of diffraction for each wavelength would correspond to the Bragg angle for a tunable HPM (FIG. 1). In this case each wavelength would be diffracted by the HPM and at the back surface of the HPM the distribution of exit angles would be identical to that at the entrance. If the second surface grating (3) (FIG. 1) is identical to the first one, all wavelengths would be diffracted to the same angle. This means that a collimated incident beam is transformed to a collimated exit beam. However, the process of diffraction from the HPM also encodes the beam with a specific phase from the HPM phase information. Therefore the collimated exit beam would include those phase relations that were encoded in the HPM. It should be noted that any other dispersive element, e.g. a prism, can be used for such procedure if it provides angular dispersion identical to that of the VBG. An additional feature of HPMs is that it is possible to record several holograms in the same volume of a photosensitive medium. Therefore the proposed technique enables recording several achromatic phase masks in the same optical element.

According to the grating dispersion equation (Eq. 1), a surface grating with a given period ($\Lambda_{SG}$) will diffract normally incident light an angle ($\theta$) in different orders as a function of wavelength ($\lambda$).

$$\Lambda_{SG} \sin \theta = m\lambda \quad (1)$$

Based on coupled wave theory, a VBG will diffract light highly efficiently at the Bragg condition (Eq. 2). Under this condition light is incident and diffracted at the Bragg angle ($\theta_B$), and diffraction efficiencies for these gratings can be as efficient as 100%.

$$2\Lambda_{VBG} \sin \theta_B = \lambda \quad (2)$$

$$2\Lambda_{VBG} = \Lambda_{SG} \quad (3)$$

If the surface grating period is double the period (Eq. 3) of the volume Bragg grating, then any first order diffraction by normally incident light will be at the corresponding Bragg condition of the volume Bragg grating and that will hold for any wavelength. If we add an identical surface grating in after the volume Bragg grating, as shown in FIG. 1, the dispersion is completely canceled and the out-going beam is re-collimated. In applying this concept to a holographic phase mask, the need for angle tuning to the Bragg condition can be disregarded, making it a fully achromatic phase element.

The experimental setup for experimentally proving the embodied concept is shown in FIG. 2.

As proof of concept, two surface gratings with a grove spacing of 150 lines/mm (a period of 6.66 µm) were aligned to a HPM with a period of 3.4 µm in our experimental set up shown in FIG. 2. The goal of the experiment was to achieve successful broadband mode conversion from a Gaussian to a $TEM_{11}$ mode without the need to angularly tune the HPM. In our experiment three different tunable diode laser sources were used in order to get a wavelength range of over 300 nm (765-1071 nm). The lasers were collimated individually with a 6 mm collimator in order to insure full illumination of the HPM. The first surface grating was aligned so that the HPM's Bragg condition would be met for all wavelengths, and then the second grating was placed to nullify the beam deviation and dispersion. Surface gratings with a blaze wavelength of 725 nm were chosen with diffraction efficiencies in the range of 50% to 70% for the corresponding 765-1071 nm spectral range. To achieve far field imaging, the beam was focused on a CCD camera with an achromatic lens (f=500 mm).

First, it was demonstrated that the HPM provided the same quality phase transformation as a regular phase mask with the main difference being that one HPM works for a very broad spectral range. The first experiment had the two surface gratings removed. The wavelength bandwidth of the HPM is limited to the bandwidth of a transmission Bragg grating and therefore it can only diffract in this particular case approximately 12 nm without angular adjustment. It was shown that images of the beam after the HPM (no surface diffraction gratings present on its sides) were observed for all wavelengths when angles of incidence were adjusted to corresponding Bragg angles.

The second experiment introduced the one surface diffraction grating (1) on the left side of the HPM (2) (FIG. 2). For this configuration, the bandwidth of the system is dramatically increased and maximum diffraction efficiency (and therefore mode conversion) is achieved over a wider spectral region. However, due to the wavelength dispersion of the surface grating the signal walks off the camera.

In the third experiment, a second surface grating (3) was added and the images for a scan of over 300 nm were recorded. It clearly proves that the combination of two surface gratings and a HPM with accordingly matched periods works as an achromatic phase element over a very wide wavelength region.

It has been successfully demonstrated that full achromatization of a holographic phase mask can be achieved with the combination of two surface gratings and a single, phase-encoded transmitting volume Bragg grating. An experimental mode conversion from a Gaussian to a $TEM_{11}$ mode for a range of more than 300 nm was successfully achieved with a single phase element and without any angular adjustments. It should be noted that the demonstrated result does not depend on a particular phase pattern of the HPM and this demonstrated achromatization can be implemented for any phase mask.

This invention creates an achromatic volume hologram of a phase element as shown in FIG. 1, where a holographic phase mask is placed in between two surface diffraction gratings or prisms that have the same angular dispersion as the volume Bragg grating. Such scheme removes the need of angular tuning of the volume grating when the wavelength is changed. The Bragg condition is automatically met for new wavelengths due to the wavelength dispersion that the first element introduces.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or"

should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

LIST OF REFERENCES INCORPORATED HEREIN BY REFERENCE

1. L. B. Glebov, "Photochromic and photo-thermo-refractive (PTR) glasses," Encyclopedia of Smart Materials, John Wiley & Sons, NY, 770-780 (2002).
2. Y. Ishii and T. Kubota, "Wavelength demultiplexer in multimode fiber that uses optimized holographic optical elements," Applied Optics 32, 4415-4422 (1993).
3. K. Aoki et al., "Selective multimode excitation using volume holographic mode multiplexer," Optics Letters 38, 769-771 (2013).
4. D. Flamm et al., "All-digital holographic tool for mode excitation and analysis in optical fibers," Journal of Lightwave Technology 31, 1023-1032 (2013).
5. Y. Wakayam et al., "Mode demultiplexer using angularly multiplexed volume holograms," Optics Express 21, 012920 (2013).
6. I. Divliansky, et al., "Multiplexed volume Bragg gratings for spectral beam combining of high power fiber lasers", Proceedings of SPIE 8237, 823705 (2012).
7. C. A. Lu, A. Flores, E. Bochove, W. Roach, V. Smirnov, and L. Glebov, "Coherent beam combination of fiber laser arrays via multiplexed volume Bragg gratings," CLEO: Science and Innovations, OSA Technical Digest, CF2N.2 (2012).
8. A. Jain, C. Spiegelberg, V. Smirnov, L. Glebov, and E. Bochove, "Efficient coherent beam combining of fiber lasers using multiplexed volume Bragg gratings," CLEO: Science and Innovations, OSA Technical Digest, CF2N.8 (2012).
9. C. A. Lu, A. Flores, E. Bochove, W. Roach, V. Smirnov, and L. Glebov, "Active coherent superposition of five fiber amplifiers at 670 W using multiplexed volume Bragg gratings," Proceedings of SPIE 8601, 86011 (2013).
10. Oleg M. Efimov, Leonid B. Glebov, Larissa N. Glebova, Vadim I. Smirnov. Process for production of high efficiency volume diffractive elements in photo-thermo-refractive glass. U.S. Pat. No. 6,586,141 B1. Jul. 1, 2003.
11. Oleg M. Efimov, Leonid B. Glebov, Vadim I. Smirnov. High efficiency volume diffractive elements in photo-thermo-refractive glass. U.S. Pat. No. 6,673,497 B2. Jan. 6, 2004.
12. Marc SeGall, Vasile Rotar, Julien Lumeau, Sergiy Mokhov, Boris Zeldovich, and Leonid B. Glebov. Binary volume phase masks in photo-thermo-refractive glass. Opt. Lett. 37 (2012) 190-192.
13. L. B. Glebov and V. I. Smirnov. Interaction of photo-thermo-refractive glass with nanosecond pulses at 532 nm. Laser-Induced Damage in Optical Materials. Ed. G. J. Exarhos, A. H. Guenther, N. Kaiser, K. L. Lewis, M. J. Soileau, C. J. Stolz. Proceedings of SPIE 5273 (2004) 396-401.
14. Leo Siiman, Julien Lumeau, Larissa Glebova, Vadim Smirnov, Leonid B. Glebov. Production of high efficiency diffractive and refractive optical elements in multicomponent glass by nonlinear photo-ionization followed by thermal development. U.S. Pat. No. 8,399,155; Mar. 19, 2013.
15. R. Galicher, P. Baudoz, and J. Baudrand. Multi-stage four-quadrant phase mask: achromatic coronagraph for space-based and ground-based telescopes. A&A 530, A43. ESO. Mar. 28, 2011.
16. D. Mawet, P. Riaud, J. Baudrand, P. Baudoz, A. Boccaletti, O. Dupuis, and D. Rouan. The four-quadrant phase mask coronagraph: white light laboratory results with an achromatic device. A&A 448, 801-808. ESO. Nov. 8, 2006.

17. P. Riaud, A. Boccaletti, D. Rouan, F. Lemarquis, and A. Labeyrie. The four-quadrant phase-mask coronagraph. ii. simulations. Astronomical Society of the Pacific, Vol. 113, No. 787. pp. 1145-1154. September 2001.

We claim:

1. An achromatic holographic phase element, comprising:
   an entrance and an exit optically dispersive element fixedly disposed in optically spaced relation to one another, wherein each of the entrance and the exit optically dispersive elements is characterized by an angular dispersion; and
   a volume Bragg grating (VBG) characterized by an angular dispersion, including at least one achromatic holographic phase mask recorded therein, the VBG being fixedly disposed intermediate the entrance and the exit optically dispersive elements, wherein the angular dispersion of the entrance and the exit optically dispersive elements matches the angular dispersion of the VBG.

2. The achromatic holographic phase element of claim 1, wherein the entrance and the exit optically dispersive elements are identical optically identical surface diffraction gratings.

3. The achromatic holographic phase element of claim 1, wherein the entrance and the exit optically dispersive elements are optically identical prisms.

4. The achromatic holographic phase element of claim 1, characterized by an achromaticity from 765 nm to 1071 nm.

5. A method for combining a plurality of optical beams each having a different spectral bandwidth into a single optical beam, comprising:
   providing an achromatic holographic phase element, comprising:
      an entrance and an exit optically dispersive element fixedly disposed in optically spaced relation to one another, wherein each of the entrance and the exit optically dispersive elements is characterized by an angular dispersion; and
      a volume Bragg grating (VBG) characterized by an angular dispersion, including at least one achromatic holographic phase mask recorded therein, the VBG being fixedly disposed intermediate the entrance and the exit optically dispersive elements, wherein the angular dispersion of the entrance and the exit optically dispersive elements matches the angular dispersion of the VBG;
   inputting a plurality of collimated optical beams each having a different spectral bandwidth to the entrance optically dispersive element.

6. The method of claim 5, wherein the plurality of input beams are in a spectral bandwidth from 765 nm to 1071 nm.

* * * * *